Jan. 3, 1967 B. J. GALLAGHER ET AL 3,295,191

METHOD OF CONSTRUCTING A BELLOWS VALVE

Original Filed March 25, 1963

INVENTORS.
BERNARD J. GALLAGHER
FRANCIS J. CALLAHAN, JR.

BY  *Fay & Fay*
ATTORNEYS

3,295,191
METHOD OF CONSTRUCTING A BELLOWS VALVE

Bernard J. Gallagher, Cleveland Heights, and Francis J. Callahan, Jr., Chagrin Falls, Ohio, assignors to Nupro Company, a corporation of Ohio
Original application Mar. 25, 1963, Ser. No. 267,699. Divided and this application Apr. 13, 1964, Ser. No. 363,322
4 Claims. (Cl. 29—157.1)

This is a division of application Serial No. 267,699, filed March 25, 1963, now abandoned.

This invention relates to a method of constructing a valve in general, and more particularly to a method of constructing a bellows valve which embodies a positive type sealing means to be used in sealing between the stem and the body portion of the valve.

In its broadest sense the valve includes a body composed of a base portion and bonnet portion which are interconnected. The bonnet portion is provided with a central bore which receives a stem means adapted to cooperate with a seat in the base portion. A bellows assembly is fluid-tightly connected to the stem and bonnet portion allowing reciprocation of the stem toward and away from the seat provided in the base. Suitable means such as a compression spring is provided constantly tending to urge the stem to the open position. Cap means rotatably abuts the free end of the stem to resist the force of the spring. The cap means is threadably interfitted with the bonnet portion so that rotation of the cap in a clockwise direction closes the valve, while counterclockwise rotation allows the spring means and line pressure to open the valve.

The bonnet is provided with a through central bore of an axial length approximately equal to the length of the bellows so as to provide a protective shield around the bellows in the absence of the operating cap which is removable for mounting and/or inspection. Such construction insures protection of the bellows which is normally of necessity fragile in construction.

The above described valve has distinct advantages over known prior art devices. The novel two part construction of the assembly has distinct advantages heretofore not known. Firstly, it permits manufacture of the valve from conventional stock such as bar and round stock. Secondly, the unique two part construction enables the one piece stem to be enlarged at the seat so that full flow may be had with reduced axial travel. The reduction in axial travel reduces the required effective axial length of the bellows with a consequent reduction in the overall size of the assembly. The stem may be of a reduced diameter in the region of the bellows obviating the necessity of a large diameter bellows capable of passing the stem seat. Beneficial results are obtained with this novel construction in the minimization of the dead space or internal volume of the valve, as well as reduction of overall size and cost of the completed assembly.

The materials utilized in the operating portion of the valve are carefully chosen so as to be galvanically compatible, notwithstanding exposure to corrosive fluids. The unique construction enables the use of diverse temperature fusion bonding techniques in the assembly of the bellows to the stem and bonnet, and the bonnet to the body. Beneficial results are obtained by such practice in that possibilities of overheating with its attendant consequences are greatly reduced. The economy of manufacture and assembly is enhanced by the unique design and assembly techniques.

Although the broad category of bellows valves is old and the prior art appears to be highly developed, a number of unsolved problems remain with respect to existing designs. Some prior art types are formed of diverse materials, which becomes galvanically incompatile when corrosive fluids are passed therethrough, thereby materially reducing the useful life of the valve.

A further objection arises in connection with prior art bellows valves which employ a body portion which is cast or otherwise produced as a unitary part. Considerable difficulty is encountered in this case in connecting the lower portion of the bellows to the body of the valve. Attempts to solve this problem have resulted in solutions of a questionable nature. Often, a ring was fastened to the bellows prior to assembly and subsequently the ring was clamped in the valve body. The low mass of the ring oftentimes did not adequately dissipate the heat produced in the connecting operation. Such heat would oftentimes cause the annealing temperature of the bellows to be exceeded, which resulted in reduction of flexure fatigue life or in case hardening of the bellows adjacent the joint. Still further difficulty was experienced in providing a fluid tight assembly capable of handling corrosive fluids over a wide range of temperatures. In an effort to prevent annealing of the bellows in the soldering operation, manufacturers have resorted to using low temperature solders such as tin and lead. This solved the annealing problem; however, low temperature solders have a tendency to lose strength under load. The strength can be increased by adding Nickel or Cesium, but the maximum strength falls short of that desirable for the wide range of applications for bellows valves.

In the instant disclosure it will become apparent that silver solders with a melting temperature of 1145° have been employed to facilitate a high strength joint between the bellows and stem and the bellows and the body. The use of a preformed solder ring having substantial thermal mass at the joint, and induction soldering techniques have served to keep the heat localized without detrimental effect to the fragile components.

The assembly of the bonnet to the body has been accomplished by a combination of a mechanical and low heat solder joint which precludes overheating on assembly, yet providing a high strength fluid tight connection which is most desirable.

The one-piece body construction of prior art devices imposed limitations on seat diameter, as well as axial stem travel. If it were desirable to have a stem with an integral seating portion of substantial size, it became necessary to use a bellows sufficiently large to be capable of attachment in the bore of the valve body. The valve body bore was necessarily large in order to accomodate the seating end of the stem. A reduction in the diameter of the stem seat permitted a reduction in the bore of the body; however, greater axial stem travel was required in order to obtain full flow. At the same time, the increase in axial stem travel necessitated the use of a bellows of substantial length. In either event, the overall size of the valve assembly and the internal volume or dead space was increased beyond desirable limits. The cost of the finished product was increased as well. Obviously, it was virtually impossible to position an enlarged stem guide adjacent the seat without enlarging the bellows, or making the stem of reduced diameter. It has long been a problem in connection with prior art devices to manufacture a bellows valve wherein the stem and seat could be made in one piece with travel of the stem guided adjacent the seating portion. Beneficial results are obtained in that stem chatter as well as misalignment at the seat are eliminated.

In the past, some prior art bellows valves have been provided with keys and the like to guard against torque transmission to the bellows when the actuating means is rotated during the opening and closing cycle. The addition of these necessary safeguards adds materially to the overall cost of the valve and to the possibility of operational failure. It has been found that such safeguards may be eliminated, if care is taken in the selection of the material from which the operating cap is constructed. Use of a material with a suitably low friction coefficient will result in transmission of very low amounts of torque to the stem during the operating cycle of the valve, with the values of the torque ultimately transmitted, being substantially below the maximum rated torsional capacity of the bellows. Several prior art prototypes have been marketed with a metal-to-metal engagement of cap to stem resulting in an increase in torque transmitted from operating cap to stem, notwithstanding the liberal use of lubricants at the joint of engagement between these two components. The use of a metal operating cap presents a further disadvantage in that the heat transfer from the body portion of the valve to the cap is enhanced, and in the case of high temperature applications, it becomes necessary for the operator to use protective gloves or the equivalent to open and close the valve.

It will become readily apparent hereinafter that the problems heretofore noted in connection with the prior art have been obviated in a bellows valve design constructed according to the principles of the instant invention. Further advantages will become readily apparent in the attainment of the objects set forth below.

It is, therefore, a general object of this invention to provide a novel valve which by its unique construction permits design miniaturization without significantly effecting otherwise favorable operational characteristics of the valve.

It is a further object of this invention to provide a novel bellows valve having a multi-part body portion.

More specifically, it is an object of this invention to provide a method of constructing a belows valve which includes the steps of providing a base portion having a fluid passage therethrough and a counterbored recess portion; providing a bonnet having a central bore therethrough and a shoulder in the bore; telescopingly inserting an open ended bellows having an axially extending end portion in the bore; orienting the bellows so that the end portion is positioned within the shoulder; fusion bonding with silver solder the end of the bellows to the shoulder; partially inserting a stem axially through the bellows; placing a ring on the exposed end of the stem; maintaining the ring in position and fusion bonding with silver solder the ring to the stem and the bellows; seating the bonnet in the counterbored base portion; swaging the base portion into mechanical engagement with the bonnet; fluid tightly sealing the mechanically connected bonnet and base by fusion bonding.

Further and fuller objects will become readily apparent upon reference to the drawing, wherein.

Figure 1:
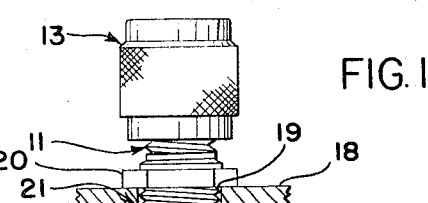
FIG. 1 is a side elevational view of the novel valve mounted in a fragmentary portion of the bulkhead shown in cross-section.

Referring now to FIGS. 1 through 4, the valve comprises a body portion indicated generally at 10, having a bonnet portion 11 and base portion 12. An operating cap 13 is threadably received on the bonnet by means of internal threads 14 in the cap interfitting with external threads 15 on the bonnet. The base portion 12 is provided with inlet and outlet portions 16 and 17, respectively. Suitable coupling means is provided to connect inlet and outlet lines thereto. While the fittings illustrated are of the swage-action variety, it is to be understood that male threads, female threads, and other suitable fittings may be utilized.

Figure 4:
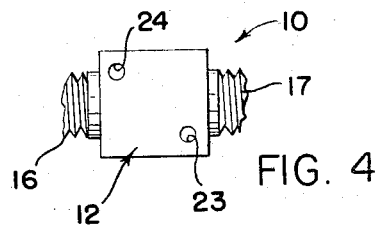
FIG. 4 is a bottom view taken along the lines 4—4 of FIG. 1 with the body shown fragmentarily and the cap portion removed.

A fragmentary portion of the bulkhead is shown at 18 having an aperture 19 through which the bonnet portion of the assembly is received. Suitable means, such as a bonnet nut 20, clamps the valve to the bulkhead between the shoulder 21 on the bonnet and the nut 20. The root diameter of the threads 22 on the bonnet is equal to or slightly greater than the crest of the threads 15 on the upper portion of the bonnet to allow the bonnet nut 20 to be easily passed thereover when bulkhead mounting is necessary or desirable. As shown in FIG. 4, suitable tapped holes 23 and 24 are provided in the base portion of the body to facilitate bracket mounting in the event that panel mounting is not feasible.

Figure 3:
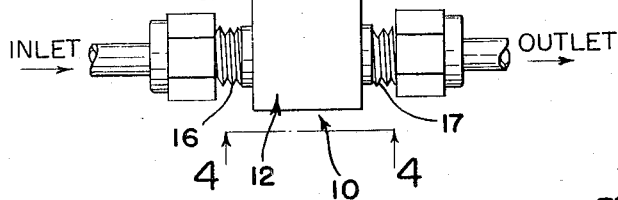
FIG. 3 is a further enlarged view similar to FIG. 2 with fragmentary portions of the cap, mounting nut, and body broken away for clarity.
Figure 3:
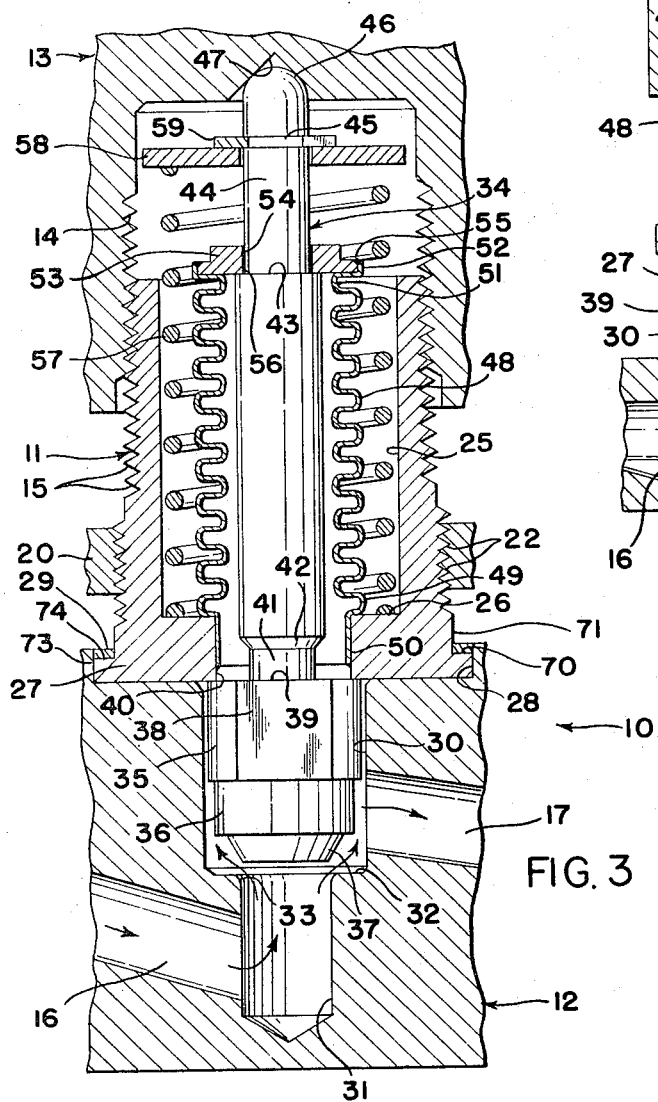
Figure 2:
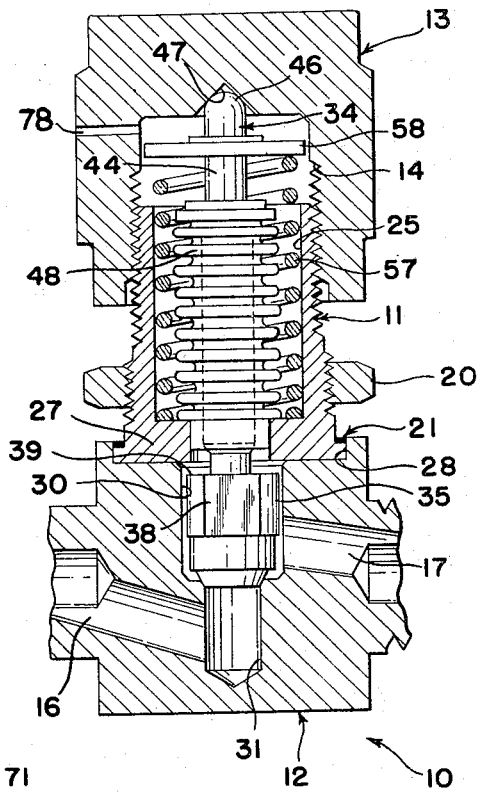
FIG. 2 is an enlarged cross-sectional view of the valve in FIG. 1 with fragmentary portions of the inlet and outlet shown.

Referring now more particularly to FIGS. 2 and 3, the bonnet 11 is provided with a central bore 25 which terminates in an inwardly projecting shoulder portion 26, forming a cylindrical end portion 27. A shoulder 70 merges with a cylindrical portion 71 of reduced diameter with respect to the end portion 27. The cylindrical portion 71 may be of a diameter equal to the crest diameter of the threads 22 for ease in manufacturing. The cylindrical end portion 27 is received in the bore 28 and the wall portions 73 are swaged to mechanically join the bonnet and body. By swage it is meant to encompass all methods of cold metal flow such as staking and the like.

The trough 74 formed in the counterbore 28 is filled with a low heat eutectic solder 29 which, due to capillary action, flows between the adjoining surfaces of the base and bonnet to form a fluid tight seal and increase the strength of the joint. The use of eutectic solder permits the use of low heat in the joining operation so that the previously formed joints and the threads 15 and 22 are uneffected thereby.

Two additional counterbores are provided coaxial with the counterbore 28, these being the counterbores 30 and 31 in the base portion 12. Inlet passage 16 communicates with counterbore 31, and, by means of the latter, with counterbore 30 and outlet passage 17. The shoulder 32 at the base of the counterbore 30 merges with the counterbore 31 through apical zone 33 to provide a seat which will be hereinafter described in greater detail. A stem 34 extends through the bore 25 in the bonnet and has an enlarged head or guiding portion 35 received in the counterbore 30. The enlarged head is relieved slightly as at 36, terminating in the frusto-conical seating shoulder 37, which is of short axial length. Although exaggerated in the drawing, in practice a clearance of .001″ to .003″ is provided between the guide 35 and the counterbore 30. This has been found to be most desirable for easy axial travel of the stem while providing good lateral support and concentricity in seating. The guide surface 35 is interrupted, as indicated at 38, by a milled flat for reasons hereinafter to become apparent.

The guiding cylindrical portion 35 terminates in a shoulder portion 39 which is of greater diameter than the inside diameter 40 of the cylindrical portion 27, thereby providing a stop or limit for the upward travel of the stem to prevent over-extension of the bellows. The shoulder 39 terminates in a cylindrical portion 41 which flares outwardly as at 42 through the bellows chamber, terminating in a shoulder 43 which merges into a cylindrical extension 44. A rectangular groove 45 is provided in the cylindrical portion 44 adjacent a dome-shaped end 46. The dome-shaped end 46 is received in a conical recess 47 in the cap 13. This insures minimum contact between the stem and the cap portions with beneficial results in the centering and guiding of the stem, as well as reduction of heat transfer and torque transmission to the stem. Suitable anti-friction means, such as a semi-solid silicone lubricant, may be provided in the conical recess 47 at assembly, which insures free, low-friction, relative rotation between the dome 46 and the cap throughout the life of the valve.

A further beneficial result is derived from the use of a phenolic plastic in the construction of the cap 13. This further reduces the amount of torque when relative rotation occurs between the dome 46 and the bore 47. Additionally, in high temperature applications, the thermal conductivity of the plastic is approximately 480 times less than that of a metal, such as aluminum, so it may be operated under most circumstances by an unprotected hand.

The stem 34 is sealed to the valve body through the use of a bellows 48, which in the instant case is composed of brass or the like. The lower fold 49 of the bellows terminates in an axially extending portion 50, which is of a diameter approximately equal to the inside diameter 40 of the cylindrical portion 27. The last fold of the bellows 49 serves as a stop to limit the insertion of the bellows into the bore 25 prior to soldering. The axially extending portion 50 is fastened to the inside diameter 40 of the cylindrical portion 27 through the use of silver solder to provide a hermetically sealed, rigid joint. The upper fold 51 of the bellows similarly terminates in an axially extending portion 52 which is of a diameter slightly greater than the outside diameter of mounting ring 53. The inside diameter 54 of the ring 53 is of a diameter such as to provide a slip fit with the cylindrical extension 44 on the stem.

In practice, the bellows 48 is fastened to the ring 53 and to the extension 44 by means of silver solder as at 55 and 56 providing a fluid tight joint. Ring 53 may be beveled at its outer periphery slightly in order to enhance the flow of solder during the soldering operation. Suitable spring means 57 bottoms on the shoulder 26 and the bore 25, with the opposite end engaging a backup washer 58 which is held in position by V-shaped clip washer 59 which may be inserted laterally into the groove 45, thereby facilitating rapid assembly. The spring 57 may be of any suitable type; however, in practice, stainless steel is preferred due to good operational characteristics under high temperature applications. Galvanic compatibility does not hamper the use of a stainless steel spring due to its being positioned externally of the bellows where it will not come into contact with the corrosive and high temperature fluids handled by the valve.

In operation, rotation of the cap 13 less than one full turn will move the stem from closed, as shown in FIG. 2, to full open, as shown in FIG. 3. The movement of the stem 34 is linear, thereby preventing galling of the seats 37 and 33. Beneficial results have been obtained by fabricating the stem from aluminum silicon bronze with the body being composed of brass. These elements are galvanically compatible, while the stem is somewhat harder than the seat. Accordingly, after a few cycles of operation, brinnelling occurs in the apical zone 33 to provide fluid-tight seating. A further advantage is found in providing an apical seat in the body portion, in that line contact seating is had with the frusto-conical portion 37 of the stem 34 reducing the possibilities of sticking. By virtue of the stem being of an enlarged frusto-conical design at the seat portion, only a slight axial retraction of the stem 34 is necessary in order to obtain full flow through the valve. In one concrete embodiment, the axial travel of the stem from full closed to full open was .050". The short travel allows a shorter bellows to be used, reducing the overall area of bellows exposed to pressure as well as miniaturizing the overall assembly and reducing the initial cost. Alignment of the frusto-conical portion 37 with the seat 33 is enhanced by the guiding portion 35 being adjacent the seating portion. This insures that the stem will remain at all times coaxial with the bore 30 and consequently the seat 33 precluding possibilities of misalignment. One or more flat portions 38 may be provided to facilitate equalization of the pressure on opposite ends of the guiding portion 35, minimizing undesirable piston effect in the valve. In the absence of flat portion 38, the stem would have to be moved against the force generated by pressure across the end of the stem since the tolerances between the guiding portions 35 and 30 are of low order. Moreover, the provision of the flat portion 38 allows fluids to enter the bellows chamber 60 readily when it becomes necessary or desirable to purge the valve.

The dead space of the valve is of extremely low order by virture of the reduced length and diameter of the bellows 48. Further, the enlarged head adjacent the seat substantially occupies all the volume of the seat. The use of a miniature bellows and short stroke stem in one concrete embodiment resulted in the total dead space or internal volume being of the order of about .052 cubic inch.

The bellows valve described above has particular application in gas analysis and gas sampling systems. More generically, where absolute leak tightness is necessary, as is the case with toxic or hazardous fluids, the bellows valve hereinbefore described is particularly applicable. Due to the unique construction of the above described valve, assembly is accomplished with ease. The bellows 48 is inserted into the bonnet portion with the last fold 49 providing a stop means on the shoulder 26. The bellows is then soldered to the bonnet portions with silver solder. Care is taken to prevent overheating which may injure the fragile bellows. The joint is preferably formed by placing a preformed solder ring between the portion 50 of the bellows and shoulder 26. Controlled localized heat is then applied by an induction machine. The proportionate size of the cylindrical portion to the bellows serves as a thermal sink to absorb any excess heat, thereby protecting the bellows from annealing. The stem is inserted through the bore 40 up through the bellows until the shoulder 39 engages the bottom of the cylindrical portion 27. The brass ring 53 is placed over the stem with the outer periphery of the ring nested within the axially extending portion 52 of the bellows. Silver solder and controlled localized heat are then applied, thereby fusing the bellows to the ring, and the ring to the stem. The ring and stem serve to dissipate the heat in order to protect the bellows during the induction welding process.

The bonnet and stem assembly is then inserted into the counterbore 28 and bore 30, respectively, in the base 12. The wall portion 73 of the counterbore 28 is gently swaged inward to form a firm mechanical connection between the bonnet and base. A low heat eutectic solder is melted by controlled heat methods into the trough 74 as heretofore explained, with capillary action causing it to flow between the interfitted parts to complete a fluid tight joint.

Due to the unique design and steps of assembling the bellows valve above described, it may be used in pressure and temperature environments heretofore impossible with known prior art devices. The short stroke of the stem on each cycle of operation materially reduces the possibilities of bellows fatigue, with the expected beneficial increase in the longevity of service.

The spring is then placed over the stem with the backup washer 58 compressing the spring downwardly to allow the lateral insertion of the clip washer 59. The cap 13 is then threadably received on the bonnet and the assembly is complete. The valve may then be subjected to pressure tests to insure absolute leak tightness. Satisfactory tests have been performed by drawing a vacuum through the valve with a helium leak detector, while applying helium to the joints. Any leak, even though small in magnitude, will be detected, thus insuring exceedingly fine quality control over the finished product. To facilitate the introduction of helium to the chamber formed by the cap 13 and bonnet 11, a fluid port 78 (FIG. 2) is placed in the cap 13, thus insuring that helium may be introduced around the bellows joints.

When it becomes necessary to mount the valve, mounting may be accomplished by use of the tapped holes 23 and 24 indicated in FIG. 4, or, alternatively, by removing the cap 13 and mounting nut 20 and inserting the bonnet through a suitable opening in a panel, as indicated in FIG. 1. The mounting nut is then drawn up tightly as shown in FIG. 1 and the cap replaced. Throughout this procedure, due to the generous axial length of the bonnet portion, the fragile bellows remains protected precluding the possibilities of damages thereto.

The term galvanically compatible as used in connection with this invention is intended to mean that the metals used in the working parts of the valve will not electrolytically deteriorate or corrode in the presence of electrolytic solutions such as acids, bases or salts. The term fusion bonding is intended to encompass all processes of joining metals with the use of heat.

It is obvious that variations may be made in the illustrated embodiment without departing from the scope of the invention. For example, the size of the operating cap and/or the pitch of the threads may be varied to develop a greater mechanical advantage if desired. Additionally, the seating surfaces 36 and 37 could be coated with synthetic resinous compositions, such as Teflon, Kel-F and the equivalent, if metal-to-metal seating is undesirable. An alternative to coating would include a plastic insert of the shape of the surfaces 36 and 37, which could be joined to the stem by a press fit, threads, set screw, or like construction. These are but a few of the departures which are envisioned as being encompassed by the present invention.

For ease of description, the principles of the invention have been set forth in connection with but a single illustrated embodiment. It is not intended that the illustrated embodiment nor the terminology employed in describing it be limiting inasmuch as variations in these may be made without departing from the scope and spirit of the invention. Rather, it is desired that any restriction to the invention be within the spirit and scope of the appended claims.

We claim:

1. A method of constructing a bellows valve including the steps of providing a base portion having a counterbored portion, providing a bonnet portion having a central bore therethrough and a shoulder in said bore, telescopingly inserting an open ended bellows having an axially extending end portion thereon in said bore, orienting said bellows so that said end portion is positioned within said shoulder, fusion bonding said bellows to said shoulder, partially inserting a stem axially through said bellows and thereafter placing a ring on the exposed end of said stem, maintaining said ring in place and fusion bonding said ring to said stem and said bellows, seating said bonnet in said counterbored base portion, swaging said base portion into mechanical engagement with said bonnet to rigidly join said bonnet thereto, and thereafter fluid tightly sealing said bonnet to said base by fusion bonding at a low temperature relative to the temperatures of the prior fusion bonding steps 2. The method of claim 1 wherein the fusion bonding of said bellows includes the use of silver solder.

3. The method of claim 1 wherein the fusion bonding of said bellows includes the use of a heat sink to dissipate the heat generated by the bonding process.

4. A method of constructing a bellows valve including the steps of:
 providing a base portion having a fluid passage therethrough and a counterbored recessed portion;
 providing a bonnet having a central bore therethrough;
 inserting in the bore of said bonnet an open ended bellows;
 securing one end of said bellows to the walls of the bonnet portion defining the central bore;
 inserting a stem through the bellows;
 securing the other end of said bellows to said stem intermediate its ends;
 seating said bonnet in the counterbored recessed portion of said base;
 swaging said base portion adjacent said counterbored recessed portion to form a mechanical interconnection between said base and said bonnet; and
 sealing said bonnet to said base by applying solder to the joint formed by the base and the bonnet.

References Cited by the Examiner
UNITED STATES PATENTS

| | | | |
|---|---|---|---|
| 1,972,815 | 9/1934 | Anneren | 251—335.2 X |
| 2,308,183 | 1/1943 | Lewis et al. | 251—335.2 |
| 2,880,620 | 4/1959 | Bredtschweider | 251—335.2 |
| 2,957,236 | 10/1960 | Kreuchen | 29—470.5 |
| 3,206,165 | 9/1965 | Salmon et al. | 251—335 |

FOREIGN PATENTS 845,239 8/1960 Great Britain.

JOHN F. CAMPBELL, *Primary Examiner.*
CHARLIE T. MOON, *Examiner.*
J. D. HOBART, *Assistant Examiner.*